United States Patent [19]
Grassi et al.

[11] 3,763,884
[45] Oct. 9, 1973

[54] CONSTANT VOLUME FLOW DEVICE

[76] Inventors: Ralph A. Grassi, 2905 Via San Jacinto; Louis J. Leemhuis, 309 E. Cordoba, both of San Clemente, Calif. 92672

[22] Filed: Feb. 14, 1972

[21] Appl. No.: 225,809

[52] U.S. Cl. ............................................. 137/504
[51] Int. Cl. ...................... F16k 31/12, F16k 31/36
[58] Field of Search ................ 138/45, 46; 137/504, 137/517, 537

[56] References Cited
UNITED STATES PATENTS

| | | | |
|---|---|---|---|
| 1,944,088 | 1/1934 | Linderoth | 137/504 X |
| 2,853,098 | 9/1958 | Fritzsche | 138/46 X |
| 3,106,226 | 10/1963 | Machen | 138/45 |

*Primary Examiner*—Henry T. Klinksiek
*Attorney*—C. A. Miketta et al.

[57] ABSTRACT

The device has a body defining a passage with an inlet portion, a smaller outlet portion, and a specially shaped progressively decreasing portion therebetween; has a restricting plate of generally the same transverse configuration as the passage but with smaller dimensions so as to provide open flow area between the plate and the body for fluid flow; has a rod attached to the plate and slidably mounted to a piston slidably positioned in a cylinder on a support member for axially mounting the plate in the progressively decreasing portion of the passage for movement therealong by the fluid flowing against the plate and through the open flow area; and has a spring extending from the plate upstream to be anchored to a rod secured to an axially adjustable cross member extending through slots in the body and having a gear wheel with fingers for threading along the spring to suitably adjust the spring rate of the spring and position the cross member relative the body to locate the plate at the position in the specially shaped progressively decreasing portion and under a suitable spring force whereby the open area corresponds to the fluid pressure force required to balance the spring force to give a constant flow of fluid. If need be, stabilizing rods may be provided from the support member through the plate to the cross member for preventing rotation of the plate relative the body. The special shape of the progressively decreasing portion is given by formulas for different types of springs and for different geometric shapes of passages and plates.

5 Claims, 10 Drawing Figures

PATENTED OCT 9 1973 3,763,884

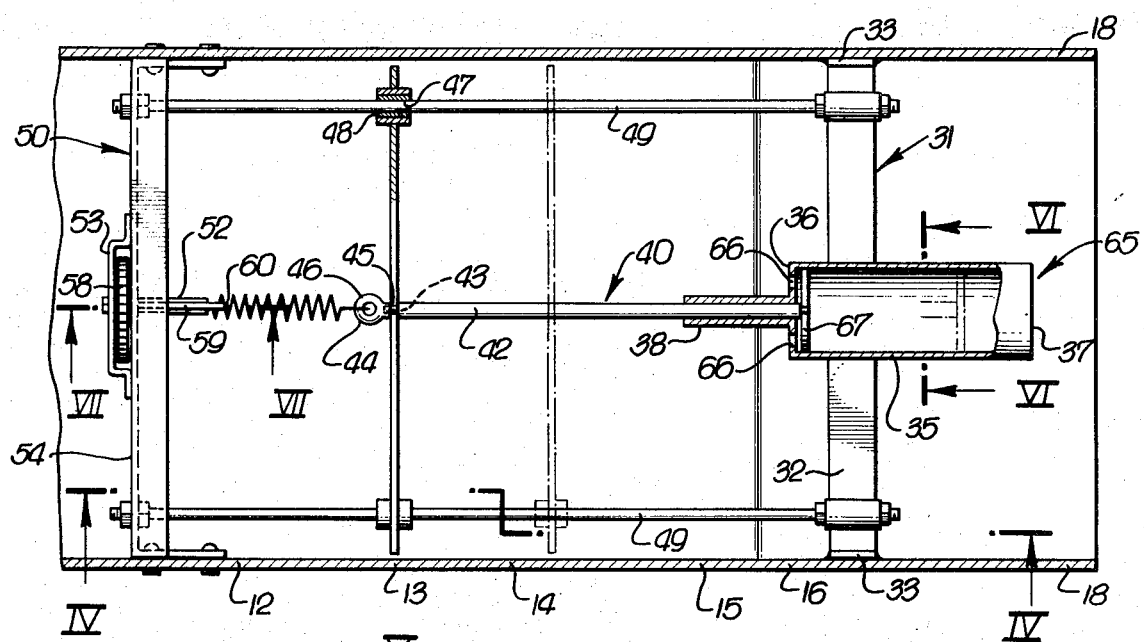
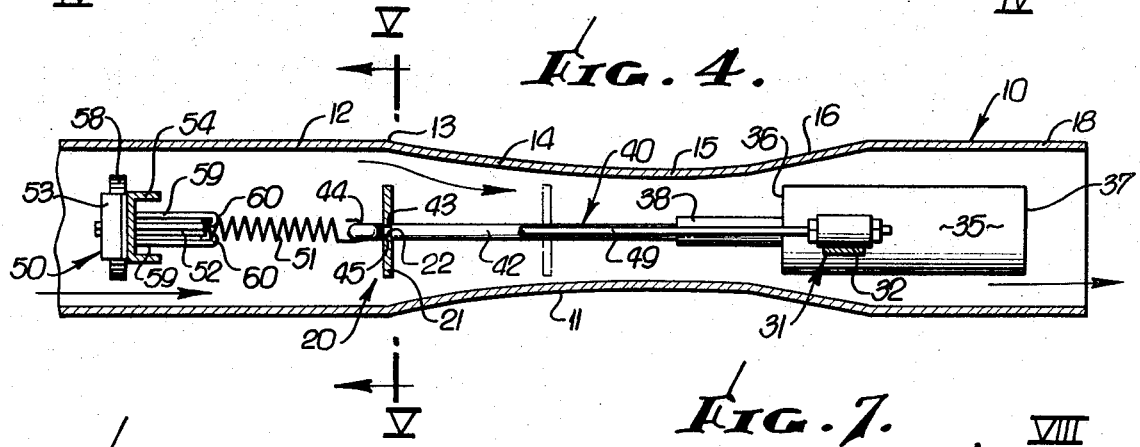
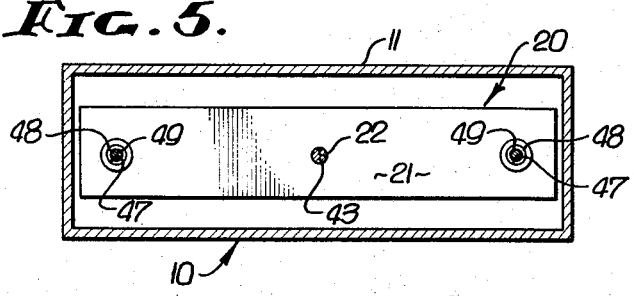
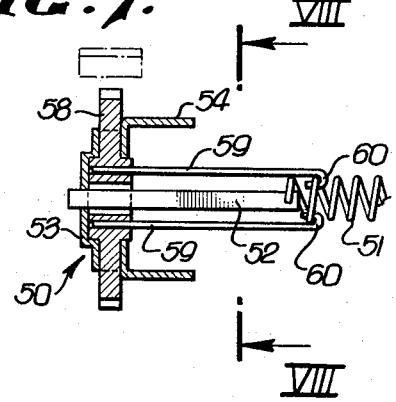
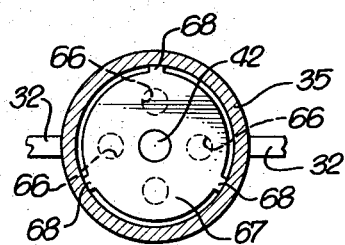

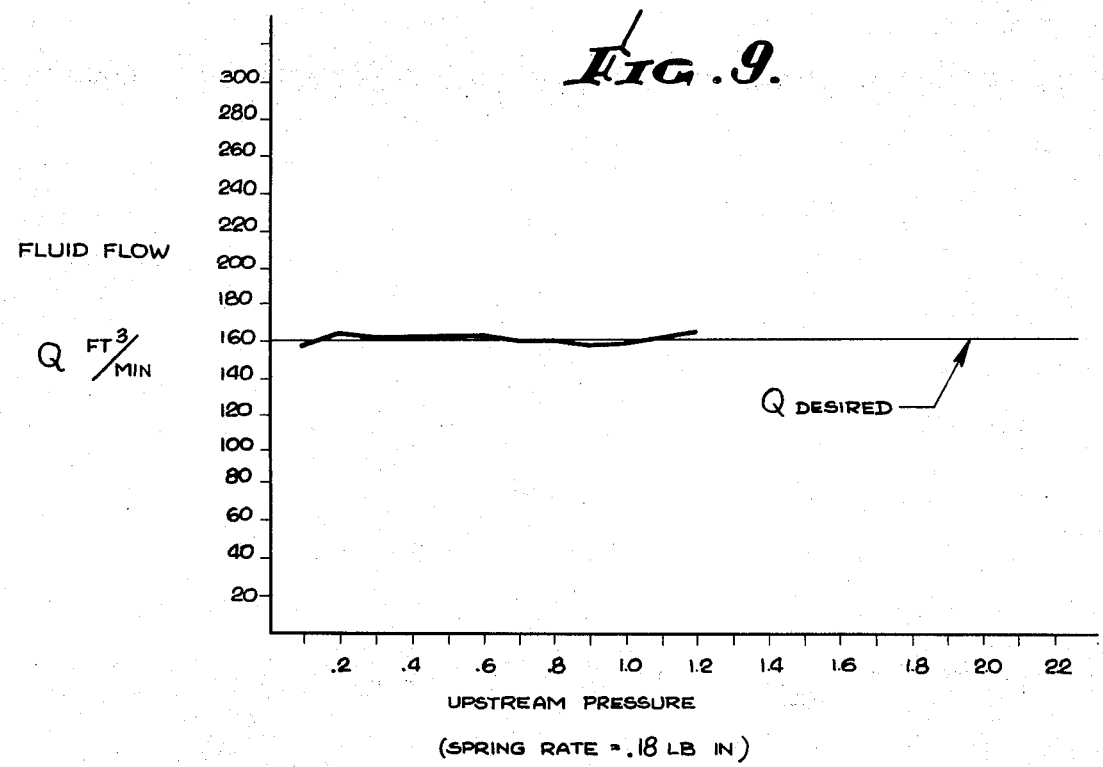
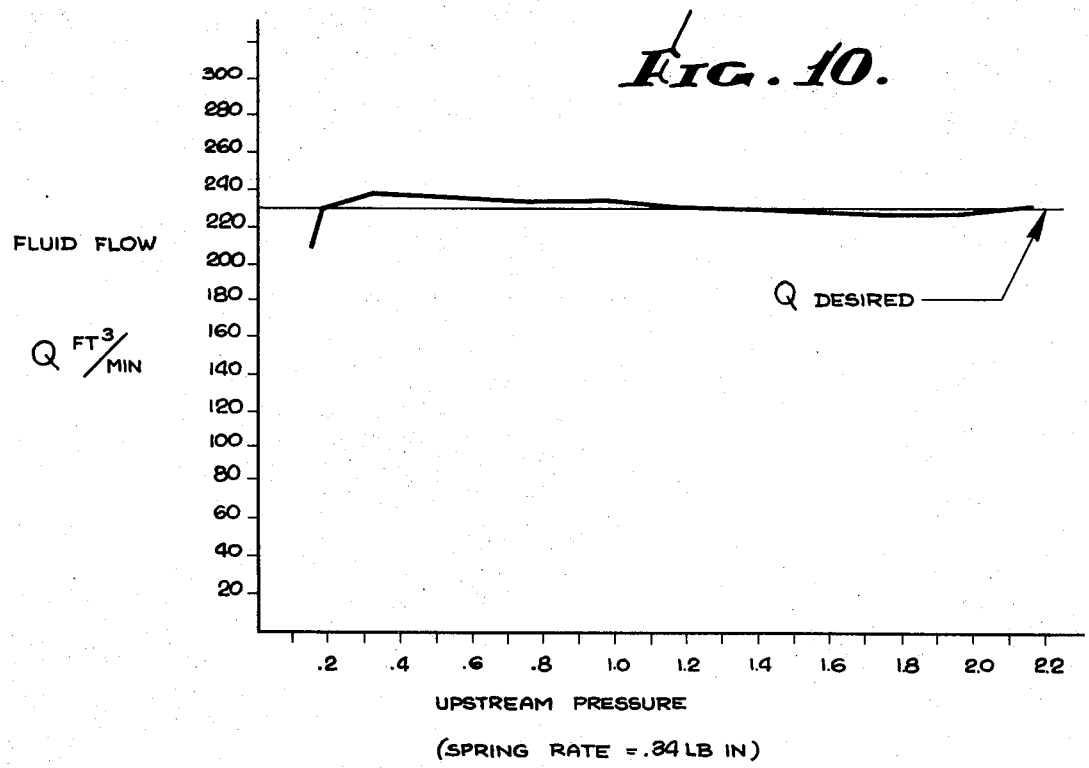

3,763,884

CONSTANT VOLUME FLOW DEVICE

BACKGROUND OF THE INVENTION

This invention relates to pipes and tubular conduits and more particularly to such a conduit which has a variably positioned restricting member for automatically providing a constant volume flow despite varying inlet pressure.

In the field of fluid flow, and particularly in the field of heating and ventilating especially in air conditioning, it is desirable to provide a constant volume of fluid flow regardless of upstream variations in the supply fluid pressure. This constant volume of air flow is desirable to provide even heating or cooling without causing drafts or other undesirable air currents.

A way to provide a constant volume of fluid flow would be to provide a valve which senses the variations in upstream pressure and which, in response to such variations, automatically changes the cross-sectional area of the valve to compensate for the variations in upstream fluid pressure. The problem is to invent an inexpensive valve which will sense a change in upstream pressure and will use the energy of the fluid flow to change the flow area to compensate for the change in pressure to maintain a constant flow. There have been many attempts to invent such a valve; see for example Baars et al., U.S. Pat. No. 3,037,528, Dillman U.S. Pat. No. 3,073,350 and Kennedy U.S. Pat. No. 3,276,480. All of these patents show valves in which fluid pressure acts on a restricting member to displace it against the balancing action of a spring to thereby reduce the cross-sectional area of the passage through which air flows and maintain a constant volume air flow. However, none of these prior art valves teaches the required relationship between the variations in pressure, the spring force and the shape of the passage for providing the necessary cross-sectional area at each axial position of the restricting member to give a constant air flow. Therefore, none of these prior art valves will accurately provide a constant fluid flow.

BRIEF DESCRIPTION OF THE INVENTION

Therefore, it is the primary object of this invention to provide a novel constant fluid flow device which accurately provides a constant fluid flow.

Other and additional objects of this invention are to provide such a device which has the proper relationship between the areas of the restricting member, the spring force and the shape of the fluid passage to automatically provide constant fluid flow; to provide such a device which provides the proper relationship between a predetermined maximum inlet pressure and a minimum inlet pressure; and to provide such a device which is inexpensive to manufacture, easy to install in a conduit system, easy to position and adjust, and which thereafter automatically provides a constant volume of fluid flow regardless of variations in the inlet pressure.

Generally, the constant flow device includes a body defining a flow passage with an inlet portion, with an outlet portion of smaller cross-sectional area than the inlet portion, and with a progressively decreasing portion between the inlet and outlet portions through which fluid flows at varying pressures, a restricting member of substantially the same transverse configuration as the cross section of the flow passage but with smaller dimensions, means for movably mounting the restricting member in the progressively decreasing portion for axial movement therealong, and means for normally biasing the restricting member axially towards the inlet portion, with the fluid flow against the restricting member moving the member axially towards the outlet portion until a balance is reached with the biasing means, with the progressively decreasing portion being provided with a decreasing cross section along the axial length thereof with the relationship of $[(A_1/A_x)^2 - 1]$ equaling the increase in the biasing force of the biasing means as the restricting member is displaced a distance $X$ from the inlet portion into the progressively decreasing portion, wherein $A_1$ is the cross-sectional area of the inlet portion and $A_x$ is the open cross-sectional area between the progressively decreasing portion and the restricting member located the distance X from the inlet portion so as to automatically regulate the fluid flow at the outlet and keep the flow constant regardless of the pressure at the input portion. If the biasing means is linear then the relationship $[(A_1/A_x)^2 - 1]$ will also be linear. Specific formulas are provided for round and rectangular cross section passages.

BRIEF DESCRIPTION OF THE DRAWINGS

FIG. 3 is a fragmentary, plan cross-sectional view, showing a second embodiment of the constant fluid flow device, suited for rectangular cross section ducts;

FIG. 4 is a fragmentary, side cross-sectional view taken along the plane IV—IV of FIG. 3;

FIG. 5 is an end cross-sectional view taken along the plane V—V of FIG. 4;

FIG. 6 is a fragmentary end cross-sectional view taken along the plane VI—VI of FIG. 3;

FIG. 7 is a fragmentary side cross-sectional view taken along the plane VII—VII of FIG. 3;

FIG. 9 and 10 are graphs of actual test results of the device, according to this invention, showing the constant fluid flow provided thereby.

DETAILED DESCRIPTION OF THE PREFERRED EMBODIMENTS

Figure 1:
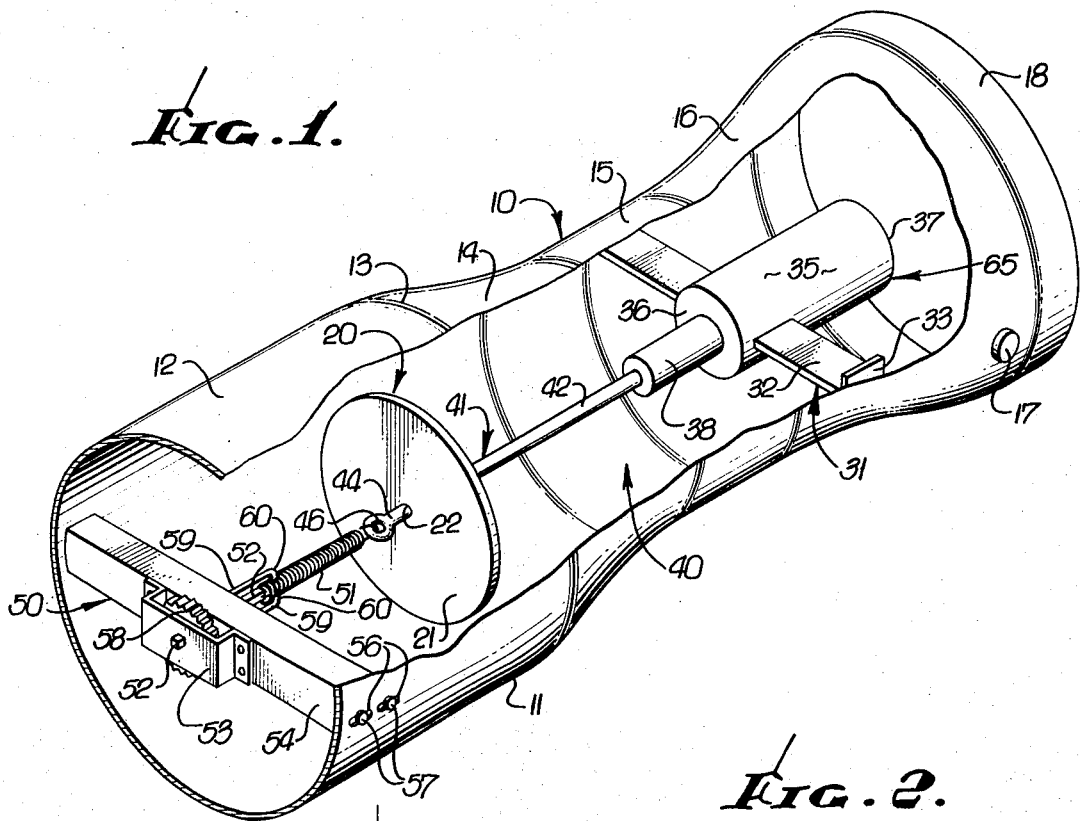
FIG. 1 is a partially cut-away, perspective view showing the constant fluid flow device, according to this invention, in a circular cross section duct.
Figure 2:
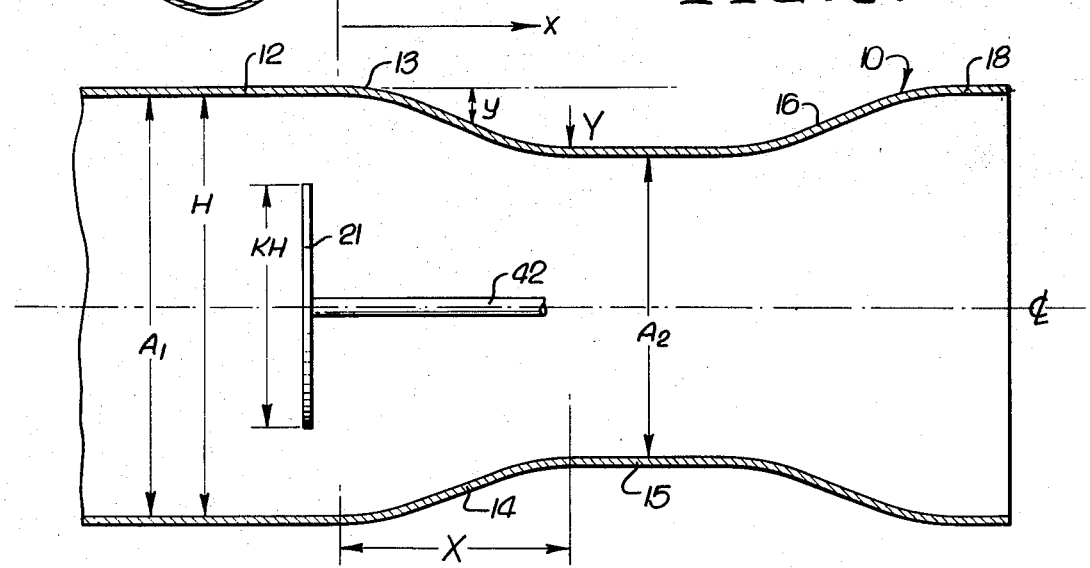
FIG. 2 is a side cross-sectional view of the device of FIG. 1, on which symbols are placed for denoting important dimensional relationships.

Referring now to the drawings and particularly to FIG. 1, a constant fluid flow device which embodies this invention is generally denoted by the number 10. The device 10 is for installation into a system of ducts to automatically regulate the flow of fluid therein to provide a constant volume flow of fluid regardless of variations in upstream or inlet pressure. While the device 10 is illustratively shown with a duct such as would be used in an air conditioning system the device 10 could be modified to be used in any fluid flow situation.

Generally, the device 10 includes a conduit or body 11 having a flow passage therein with an inlet portion 13, an outlet portion 15 and a progressively decreasing portion 14 therebetween with the progressively decreasing portion being shaped, according to a predetermined relationship, which is part of this invention; a restricting member 20 of similar transverse shape to the flow passage; means 30 for movably mounting the restricting member 20 in the flow passage for axial movement therealong; means 50 for biasing the restricting member 20 upstream and means 65 for dampening any oscillation permitted by the biasing means 50 so that the flow of fluid against the restricting member 20 will automatically position the member 20 in the progressively decreasing portion 14 suitably to provide a constant volume flow regardless of variations in upstream pressure.

As seen in FIG. 1, the conduit or body 11 is generally tubular in shape and illustratively shown as being circular in cross section. However, the body 11 could be of any similar cross section to the cross-section of the ducts to which it is to be joined. Commonly these shapes are round, as shown in FIG. 1, square, rectangular as shown in FIG. 5, eliptical or other regular shape. Typically, the body 11 will be constructed of sheet metal, plastic or other thin walled materials so that the passage therein will have a cross-sectional area which is similarly shaped to the shape of the body 11.

Axially, the flow passage in the body 11 is divided into portions of varying cross section beginning with an initial portion 12 of generally uniform cross section which will be joined to the upstream duct (not shown) to receive fluid therefrom. The initial portion 12 terminates at an inlet portion 13 at which a progressively decreasing portion 14 begins to decrease in cross-section along its length according to a relationship as will be later explained in detail. The progressively decreasing portion 14 terminates in an outlet portion 15 which has the smallest cross-sectional area. The outlet portion 15 joins to a pregressively increasing portion 16 having a hole in the side thereof closed by a button 17. The progressively increasing portion 16 terminates in a final portion 18 of generally the same cross section as the initial portion 12. The final portion 18 may exhaust the fluid directly into a room or may be joined to outlet ducts (not shown) to convey the fluid to rooms in remote locations. The portions may be provided by suitably forming the walls of the progressively 11, as is shown, or may be provided by inserts located on the walls of the body 11.

In order to regulate the flow of fluid along the passage to provide a constant volume of fluid regardless of the upstream pressure, a restricting member 20 is provided. In the preferred embodiment, the restricting member 20 will have generally the same transverse configuration as the flow passage of the body 11 but will be of smaller dimensions. In the illustrative embodiment of FIG. 1, the restricting member 20 is a round plate or disc 21 with a central aperture 22. If the flow passage was elliptical, the plate 21 would also be elliptical, and so on, for other regular oblong section passages. In the preferred embodiment, it is desirable that the difference in dimensions of the plate 21 and passage in the body 11 be uniforming to make the relationship between the plate 21 and its position in the progressively decreasing portion 14 easier to calculate.

In the alternative preferred embodiment as seen in FIGS. 3, 4 and 5 the restricting member has a shape which is related to the shape of the flow passage. In FIG. 5, the passage is rectangular and the restricting member is a plate 21 which is also rectangular and which is elongated to extend from side to side of the passage to provide upper and lower areas for the fluid to flow through. The plate 21 of the alternative preferred embodiment has an aperture 22. The plate 21 is mounted to the body 11 by mounting means 30.

In the preferred embodiments, means 30 are provided for movably mounting the restricting member 20 in the flow passage of the body 11 in the progressively decreasing portion 14 thereof, for axial movement therealong to regulate the flow of fluid in the passage. The means 30 includes a cross member 31 having a web and flanges 33 which together are suitably shaped to be positioned in the outlet portion 15 of the body 11 to extend across the flow passage. The flanges 33 may be welded or otherwise suitably secured to the body 11 to locate a cylinder 35 thereon, coaxially with the passage of the body 11. As seen in FIG. 3, the cylinder 35 has upstream and downstream ends 36 and 37 with the upstream end 36 having an upstream extending guide sleeve 38 for receiving the guide means 40.

The guide means 40 of the preferred embodiments includes a guide rod 41 with a downstream portion 42 which is longer than the length of the progressively decreasing portion and which is uniform in diameter to be slidable received in the sleeve 38. The upstream end of the downstream portion 42 has a threaded stud 43 which is sized to tightly fit through the central aperture 22 of the plate 21. An upstream portion 44 has a downstream end with a tapped hole 45 which threads over the stud 43 to join the two portions 42 and 44 together with the plate 21 therebetween. The upstream portion 44 is completed by an eye 46 on the upstream end thereof for receiving the biasing and adjusting means 50.

The mounting means 30, of the alternative preferred embodiment of FIG. 4, are the same as previously described but with the addition of a pair of laterally spaced holes 47 in the plate 21 adjacent the side wall of the conduit 11. The holes have Teflon inserts 48 therein to slidably receive rods 49 therethrough. The rods 49 extend between the cross member 31 and the cross bracket 54 to provide rotational stability to the rectangular plate 21 and prevent it from jambing into the body 11 during the positioning thereof by the biasing and adjusting means 50.

Figure 8:
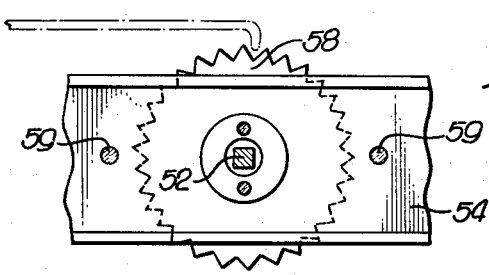
FIG. 8 is a fragmentary end cross-sectional view taken along the plane VIII—VIII of FIG. 7 showing the gear wheel, being turned by a tool (shown in phantom lines) to adjust the spring rate of the constant fluid flow device of this invention.

The biasing and adjusting means 50 is for normally biasing the restricting member 20 axially towards the inlet portion 13 against the force of fluid on the restricting member 21. In the illustrative embodiment, the biasing means 50 includes a spring 51 with one end hooked to the eye 46 and the other end hooked to the eye of an anchor 52. As seen in FIGS. 7 and 8, the anchor 51 extends through a hat shaped bracket 53 to be slidably but nonrotatably secured thereto. The hat shaped bracket is mounted on the web of a cross bracket 54 having flanges 55. The sides of the body 11 having slots 56 therein in which are located bolts 57 extending through the flanges 55 and which permit the cross bracket 54 to be axially adjusted. Between the hat shaped bracket 53 and the cross bracket 54, a gear wheel 58 is located and rotatably mounted. The gear wheel 58 has downstream extending arms 59 with hooked ends 60 to hook over and thread along the coils of the spring 51 to change the spring rate thereof.

Both embodiments of the device 10 are provided with dampening means 65 for dampening any oscillations of the plate 21 caused by the flow of fluid thereagainst and permitted by the spring 51. The dampening means 65 as seen in FIGS. 1, 3, 4 and 6 includes the provision of vent holes 66 in the upstream end 36 of the cylinder 35. The dampening means also includes the provision of the piston 67 in the cylinder 35 and connected to the downstream end of the downstream portion 42 of the rod 41. As seen in FIG. 6, the piston 67 has three equally circumferentially roadially spaced ridges 68 which ride on the walls of the cylinder 35 to space the edge of the piston 67 therefrom to permit the slow escape of fluid from behind the piston 67. The action of the piston 67 in the cylinder 35 will dampen any oscillation that might occur as the plate 21 is moved by the air pressure thereon.

The plate 21 and the guide rod 41 are located in the passage of the body 11 with the rod 41 extending through the sleeve 38 to locate the piston 67 in the cylinder 35 for axial movement of the unit along the body 11. The spring 51 exerts a biasing force on the plate 21 which changes as the length of the spring 51 changes. The plate 21 moves axially against the biasing of the spring 51 because of the pressure of the fluid flowing thereagainst. Since the position of the plate 21 in the progressively decreasing portion 14 of the passage of the body 11 is directly related to the pressure of the fluid thereagainst, the position of the plate and the shape of the progressively decreasing portion should be provided with a relationship which compensates for the variation in pressure by changing the flow area and thereby automatically maintaining the constant flow.

Since the area of the plate 21 is fixed, an increase in the upstream pressure of the guide thereon, will produce a force which will cause the spring 51 to stretch until the force of the spring 51 balances the force of the fluid on the plate 21. At this balance location of the plate 21 in the progressively decreasing portion, the difference in the cross sectional areas of the passage and the plate 21 should be such that the desired volume of fluid flow for the given pressure is provided. For a decrease in the upstream pressure, the force on the plate 21 will decrease and to balance this force the spring 51 will contract to move the plate 21 to a different location in the progressively decreasing portion 14. At this location, again the difference in cross sectional areas of the plate and the passage should be such that the same volume of fluid flow for the different given pressure is provided. It is this relationship between the cross-sectional areas of the plate 21 and passage along the axial length of progressively decreasing portion which will make the previously described structure into a constant flow device 10 and it is this relationship which has not been taught in any of the prior art constant flow devices.

The fluid flow, $Q=AV$ where $A$ is the open cross sectional area and $V$ is the fluid velocity and since the fluid flow $Q$ is to be a constant throughout the flow passage of the body 11, $A_{inlet} V_{inlet} = A_x V_x$ where $x$ is a variable distance into the progressively decreasing portion. Bernoullis Energy Equation for substantially equal heights above a datum plane where $W$ is the specific weight in pounds per cubic foot, is $P_{inlet}/w\ 2 + V^2_{inlet}/2g = P_x/w\ 2 + V_x^2/2g$ or $$P_{inlet} - P_x = \left(\frac{V_{inlet}}{2\alpha/w}\right)\left(\frac{A^2_{inlet}}{A^2_{inlet}}\right)\left[\frac{A_{inlet}}{A_x} - 1\right]$$
$$= \left(\frac{Q}{\sqrt{\frac{2g}{w}}} A^2_{inlet}\right)^2 \left[\left(\frac{A_{inlet}}{A_x}\right)^2 - 1\right]$$

Since $Q$ is a constant, and the area of the inlet is a constant, then $p_{inlet} - P_x = $ Constant $[(A_{inlet}/A_x)^2 - 1]$. The location of the plate 21 in the progressively decreasing portion 14 is determined by the balance between the force exerted by the spring 51 and the force of the fluid pressure on the plate 21, i.e., the pressure at $x$ distance into the inlet times the area of the disk = the spring force of the spring at $x$ distance into the progressively decreasing portion 14. Since the area of the disc is a constant, $P_{inlet} - P_x = $ constant $[(A_{inlet}/A_x)^2 - 1] = $ change in the force exerted by the spring as the spring 51 is stretched a distance $x$ into the progressively decreasing portion 14. Thus the relationship required for constant flow is $[(A_{inlet}/A_x)^2 - 1]$ equals a constant times the spring force at the distance $x$.

Spring forces over the distance $x$ can be represented by very complicated formulas for many types of springs bu for special springs, known as linear springs, the spring but over a variable distance $x$ is linear. A general linear equation is $y = M_x + B$ with the values of $M$ and $B$ determined by the physical boundaries. Thus our formula becomes $[(A_{inlet}/A_x)^2 - 1] = M_x + B$ for linear springs.

If $x$ is the distance from the inlet portion 13 into the progressively decreasing portion 14 and $y$ is the decrease in height from the inlet portion 13 of the progressively decreasing portion 14, then the equation may be solved for the constants $M$ and $B$ for the various shapes of ducts.

After solving this equation the formula for a round cross section duct having an inlet portion radius $R_1$, a ratio $K$ between the radius of the inlet portion and the radius of the plate 21, and a total length $X$ for the progressively decreasing portion 14 is $$y = R_1\left[1 - \left\{\left[\frac{\left(\frac{A_1}{A_x}\right)^2 - (-k^2)^{-2}}{X}\right]x + (1-k^2)^{-2}\right\}^{-1/2} + k^2\right]^{1/2}$$

In the alternative preferred embodiment of FIG. 4, the formula is slightly different. The formula for a rectangular or square duct having an inlet portion $H$, a ratio $K$ between the height of the passage and the plate, and a total length $X$ for the progressively decreasing portion 14 is $$y = H\left[(1-k) - \left\{\left[\frac{(A_1/A_x)^2 - (1-k)^{-2}}{X}\right]x + (1-k^{-2}) - 1\right\}^{-1/2}\right]$$

Practically, the shape of the progressively decreasing portion 14 will be calculated for a chosen length of stroke $X$, a given area of the plate 21, a given area of the inlet portion 13 and of the outlet portion 15 for the expected pressure variations in the upstream fluid flow to provide the desired constant volume of fluid flow through the device 10. Then upon assembly and installations of the device 10, the device 10 will have to be properly positioned.

The position of the device 10 involves the positioning of the plate 21 with the proper biasing force from the spring 51 thereon, in the progressively decreasing portion 14 of the body 11. For this purpose, the button 17 is removed from the hole and an instrument inserted into the passage of the body 11 to sense the flow rate.

The bolts 57 are then moved, to move the cross bracket 54 to its proper location in the conduit 11 and thereafter tightened. The gear 58 may now be rotated by a screwdriver or other suitable tool (shown in phantom lines in FIG. 8) to thread the hooked ends 60 of the arms 59 along the coils of the spring 51 to adjust the spring rate thereof to match the flow rate. When the flow of fluid is stopped the spring 51 will contract to pull the plate 21 out of the progressively decreasing portion 14 and into the initial portion 12 to rest there until the fluid flow begins again.

The proof of the effectiveness of this invention is shown in the results of test performed on ducts having a constant fluid flow device 10 in accordance with this invention. A sample thereof, the following test results are for an 8 inch circular duct with a constant fluid flow device 10 therein, according to this invention, having a spring 51 with a spring rate of 0.18 lbs. per in.

| Run | 1 | 2 | 3 | 4 | 5 | 6 | 7 | 8 | 9 | 10 | 11 | 12 |
|---|---|---|---|---|---|---|---|---|---|---|---|---|
| Pressure | 0.1 | 0.2 | 0 3 | 0.4 | 0.5 | 0.6 | 0.7 | 0.8 | 0.9 | 1.0 | 1.1 | 1.2 |
| Flow rate | 160 | 171 | 168 | 168 | 168 | 168 | 164 | 164 | 160 | 160 | 164 | 168 |

These results are shown in graph form in FIG. 9 as providing very nearly a constant fluid flow $Q$, regardless of the changes in upstream pressure.

For the same duct and device 10, with a spring 51 having a spring rate of 0.34 lbs. per in. the results are:

| Run | 24 | 25 | 26 | 27 | 28 | 29 | 30 | 31 | 32 | 33 | 34 |
|---|---|---|---|---|---|---|---|---|---|---|---|
| Pressure | .15 | .25 | .35 | .7 | .75 | 1.0 | 1.25 | 1.5 | 1.75 | 2.0 | 2.25 |
| Flow rate | 212 | 236 | 240 | 238 | 233 | 233 | 230 | 230 | 227 | 227 | 230 |

These results are shown in graph form in FIG. 10 to again provide a very nearly constant fluid flow $Q$ regardless of the changes in upstream pressure. Thus, the constant fluid flow device 10 has solved the problems of automatically compensating for variations in upstream fluid pressure to provide a constant fluid flow downstream thereof.

I claim:

1. In a constant fluid flow device having a body defining a flow passage with an inlet portion, an outlet portion of smaller cross-section than the inlet portion, and a progressively decreasing portion between said inlet and outlet portions, said body adapted to conduct a flow of fluid through said passage wherein such flow has a varying pressure at said inlet portion, a restricting member of substantially the same transverse configuration as the cross-section of the flow passage but with smaller dimensions, means for movably mounting said restricting member in said flow passage in said progressively decreasing portion thereof for axial movement therealong to regulate the fluid flow through said passage, means for normally biasing the restricting member axially toward said inlet portion with said fluid flow forcing said restricting member axially toward said outlet portion against the action of said biasing means, said restricting member being located at a position in the flow passage where the force thereon from said fluid flow equals the force thereon from said biasing means, the improvement comprising:

the provision of a shape to said progressively decreasing portion to provide a cross-section along the length thereof having the relationship of $[(A_1/A_2)^2-1]^{one\text{-}half}$ equals the increase in the biasing force of said biasing means as the restricting member is displaced a distance $x$ from the inlet portion into the progressively decreasing portion, wherein $A_1$ is the cross-sectional area of the inlet portion, $A_x$ is the open cross-sectional area between the progressively decreasing portion and the restricting member located the distance $x$ from the inlet portion; and said biasing means increasing linearly with the distance $x$ from the inlet portion such that the relationship $[(A_1/A_2)^2-1]^{one\text{-}half}$ equals a linear function of the distance $x$, so as to automatically regulate the fluid flow at said outlet portion and keep said flow constant regardless of the varying pressure at said inlet portion.

2. In the constant fluid flow device of claim 1 wherein said means biasing said restricting member is provided by a linear spring, and further comprising; means for adjusting the rate of said linear spring to provide different constant flow rates through said device, each constant rate being independent of pressure variations at said inlet portion.

3. In the constant fluid flow device of claim 2, further comprising; means for dampening oscillations of said restricting member otherwise caused by the action of said spring biasing means in the presence of pressure fluctuations in the flow of fluid through said device.

4. In the constant fluid flow device of claim 1, wherein said body defines a flow passage of circular cross-section and said restricting member is also circular in transverse configuration and has a smaller diameter than that of said flow passage, and wherein the relationship between a decreasing value y in the diameter of the flow passage as a function of the axial distance $x$ into the progressively decreasing portion is shown by the formula:

$$y = R_1 \left[ 1 - \left\{ \left( \left[ \frac{(A_1/H_2)^2 - (1-k^2)^{-2}}{X} \right]_x \right. \right. \right.$$
$$\left. \left. \left. + [1-k^2]^{-2} \right)^{-1/2} + k \right\}^{1/2} \right]$$

for a spring force which increases linearly also as a function of the axial distance $x$, and wherein $A_1$ is the cross-sectional area of said inlet portion, $A_2$ is the cross-sectional area of said outlet portion, $X$ is the length of the progressively decreasing portion, $R_1$ is the radius of the inlet portion and $k$ is the ratio of the radius of said inlet portion to the radius of said circular restriction member.

5. In the constant fluid flow device of claim 1 wherein said body defines a flow passage of rectangular cross-section and said restricting member has a rectangular cross-section in which one of the dimensions thereof approaches that of a corresponding first dimension of said flow passage and said progressively decreasing portion of said flow passage is provided by a decreasing second dimension, said restricting member and said flow passage body having mating bearing means interconnected therebetween, and wherein the relationship between a decreasing y value in the second dimension of said passage as a function of the axial distance $x$ into the progressively decreasing portion of said body passage is defined by the formula:

$$Y = H\left[(1-k) - \left\{\left[\frac{(A_1/A_2)^2 - (1-k)^{-2}}{X}\right]x + [1-k^{-2}] - 1\right\}^{-1/2}\right]$$

for a spring bias having a force increasing linearly as a function of the axial distance $x$, where $A_1$ is the cross-sectional area of said inlet portion, $A_2$ is the cross-sectional area of said outlet portion, $X$ is the length of the progressively decreasing portion, $H$ is the height (second dimension) of the inlet portion, and $K$ is the ratio of the height of the inlet portion of the passage to the height of the restricting member.

* * * * *